UNITED STATES PATENT OFFICE.

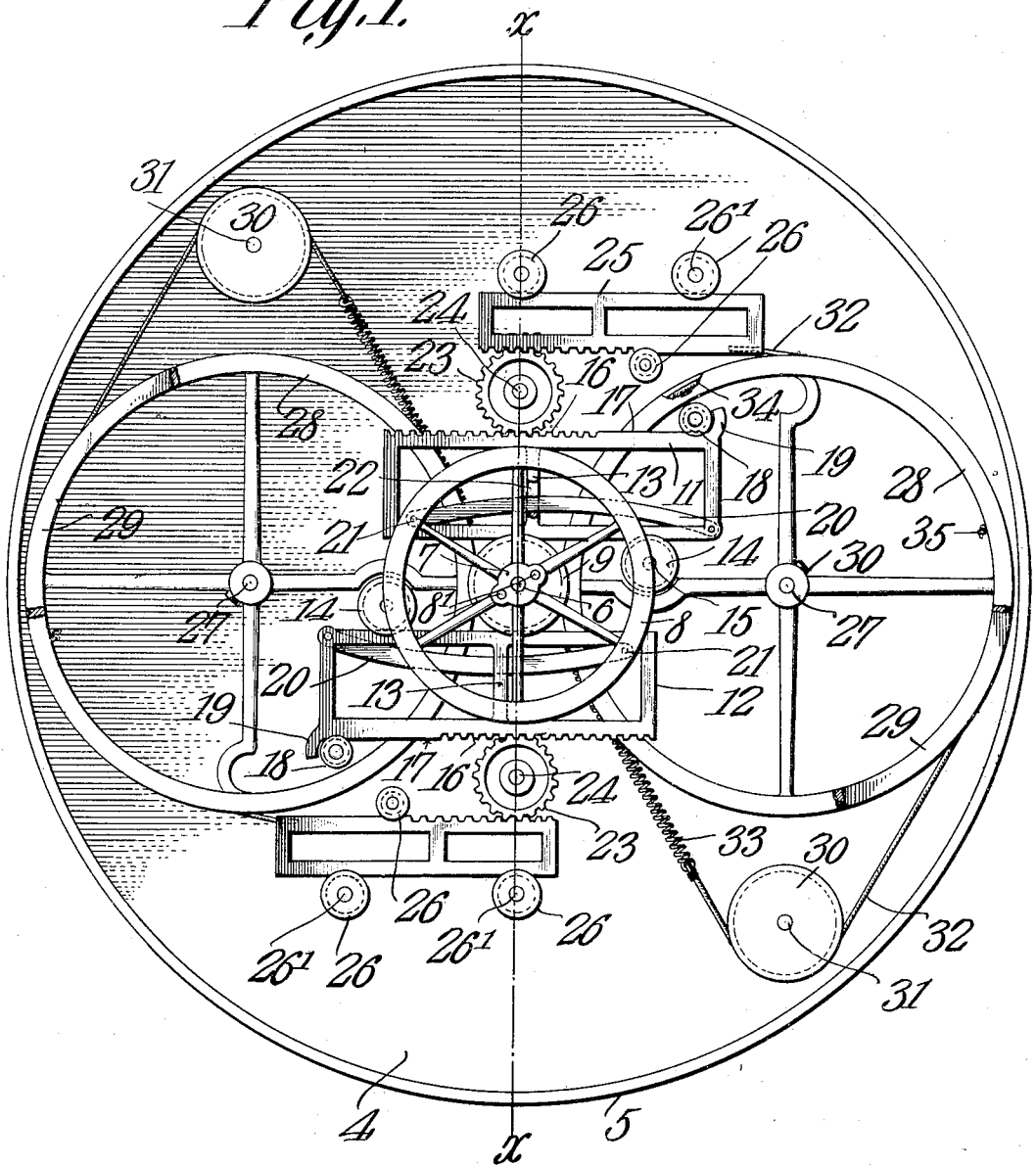

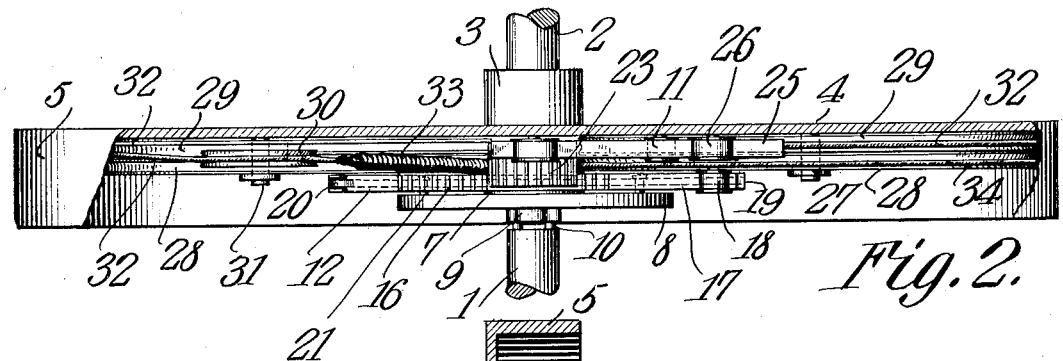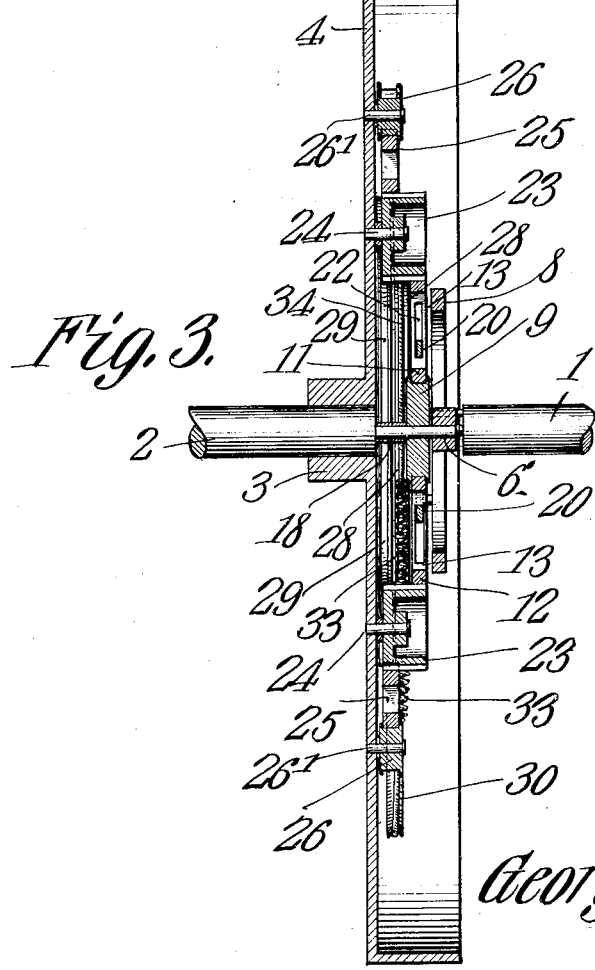

GEORGE MILNER, OF BROOKLYN, NEW YORK.

POWER-TRANSMISSION GEARING.

No. 896,654.     Specification of Letters Patent.     Patented Aug. 18, 1908.

Application filed October 21, 1907. Serial No. 398,477.

*To all whom it may concern:*

Be it known that I, GEORGE MILNER, a citizen of the United States, residing at Brooklyn, in the county of Kings and State of New York, have invented a new and useful Power-Transmission Gearing, of which the following is a specification.

This invention has reference to improvements in power transmission gearing and its object is to obtain an increase of power from a driving member to a driven member, and this is more especially true where it is desired to produce an increased starting torque.

The invention consists essentially in the driving member and a driven member, and intermediate members connecting the driving member to the driven member, which intermediate members include elastic connections so arranged that the driving member may have a considerable extent of travel before the driven member is brought up to speed, so that the time element enters into the movements sufficiently to produce a large increase of power between the driving member connected either directly or indirectly to an engine or other prime mover, and a driven member which may be connected directly to the work.

The invention will be best understood from the following detailed description, taken in connection with the accompanying drawing forming part of this specification, in which, Figure 1 is an elevation of the transmission gearing with some parts broken away and others shown in section. Fig. 2 is an edge or plan view of the transmission gearing with parts broken away. Fig. 3 is a section on the line *x—x* of Fig. 1.

Referring to the drawings, there is shown a drive shaft 1 which may be considered either as the drive shaft of the engine or the armature shaft of an electric motor, or even a countershaft receiving power from some prime mover. In line with the drive shaft is the driven shaft 2 which may be directly connected to the work, or may be indirectly connected thereto, as may be found most desirable. Only the contiguous ends of the drive and driven shafts are shown; it will be understood, however, that these shafts are, in practice, provided with suitable bearings, as may be needed. The shaft 2 enters and is suitably secured to the hub 3 of the disk 4, which latter, for the more convenient housing of parts to be described, is provided with an annular flange 5 projecting to one side of said disk at its periphery. The shaft 2 likewise carries axially a stem 6 projecting to a point close to the drive shaft 1.

Mounted upon the stem 6 is the hub 7 of a wheel 8 and this hub 7 is provided with a number of perforations 8' for the reception of pins 10 upon the end of the drive shaft 1. These pins form a coupling by means of which the drive shaft 1 is directly connected to the wheel 8 to rotate the same. In the drawings, no attempt is made to show relative proportions of these parts, but it will be understood that within the practical embodiment of the invention the parts are all made in the proper proportion to safely transmit the desired power. Also mounted loosely upon the stud 6 is a grooved roller 9 which may be spaced from the shaft 2 by a sleeve 18, or it may be located upon the stud 6 in any other suitable manner. Engaging this roller 9 on diametrically opposite sides thereof are two rack frames 11, 12, each substantially rectangular in shape with a mid-strut 13. That side of each rack frame 11 and 12 engaging the roller 9 is further supported by a groove idler 14 mounted upon a pin 15 projecting from the disk 4. The roller 9 and corresponding idler 14 serve simply as supports for the corresponding rack frame 11 or 12. Directly opposite that portion of the rack frame supported upon the rollers 9 and 14 are cut a series of teeth constituting a rack section 16 extending for a distance along the side of the rack frame, and this side of the rack frame ultimately terminates in a smooth section 17, that is, a section free from gear or rack teeth. The smooth section of the rack frame is engaged by a grooved roller 18, and the rack frame is formed with a projection 19 limiting the movement of the rack frame in one direction of its travel. Each rack frame 11 and 12 is similarly provided with a rack bar section 16 and guide roller 18, together with the stop or projection 19, and, in practice, these rack frames move simultaneously, but in opposite directions with relation to the disk 4. The rack frames are each connected to the periphery of the wheel 8, or, more properly, to the rim of the wheel 8, by a link 20 pivotally connected to that corner of the rack frame which is nearest the idler 14, and having its other end connected to a pin 21 projecting from the rim of the wheel 8, the link 20 extending centrally through the rack frame and passing through a slot 22 in the midstrut 13 of the corresponding rack frame. Since there are two rack frames, there are, of course, two links 20, and these links are connected to the rim of the wheel 8 at diametrically opposite points, the links tending to cause longitudinal movement of the rack frames when the wheel 8 is rotated upon the stem 6, and the links being centrally located with reference to the rack frames, the latter are not subjected to side strains.

Each rack bar 11 and 12 is engaged by a pinion 23 mounted upon a stud 24 projecting from the disk 4. There are two of these pinions 23 on diametrically opposite sides of the axis of the disk 4, and in a plane passing through said axis. Still more remote from the axis of the disk than are the pinions 23 are other rack frames 25 mounted for free longitudinal movement upon a number of guide rollers 26 mounted upon studs 26' projecting from the disk 4. To accommodate certain other portions of the mechanism, the rack frames 11 and 12 set out for a distance from the face of the disk 4, while the rack frames 25 are quite close to the disk. For this reason, the pinions 23 are made of sufficient width to engage both rack frames, and for this purpose, these pinions may be made cup-shaped, as shown in the drawings, or they may be made of any other suitable shape.

When the wheel 8 is turned upon its axis, the rack frames 11 and 12 are caused to move in straight lines but in opposite directions with reference to each other, and thereby impart rotative movement to the pinions 23, and in turn these pinions impart longitudinal movement to the rack frames 25, so that the latter, however, move in opposite directions one to the other and also in opposite directions to the contiguous rack frames 11 or 12. This movement of the rack frames, being transmitted one to the other through the pinions 23, the latter are not subjected to any particular strains, except the rotative strain, and their bearings are therefore not subjected to any particular stresses.

Mounted upon studs 27 located at equal distances on diametrically opposite sides of the axis of the disk 4, and in a plane at right angles to the plane cutting the axes of the pinions 23, are two pairs of large grooved wheels 28, 29. The grooved wheel 28, which is the one more remote from the disk 4, is fixed upon its stud 27 by a set screw 30, while the grooved wheel 29 is freely rotatable upon the corresponding stud 27. Thus, there is located upon each side, and at equal distances from, the axis of the disk 4 a pair of grooved wheels, one of which rotates freely upon its supporting journal stud and the other of which is fixed against rotation upon said stud. These grooved wheels are of a diameter a little less than the radius of the disk 4.

Located near the periphery of the disk 4 at points equi-distant from and on opposite sides of the axis of the disk are two rollers 30, 30 having grooved peripheries and freely rotatable upon supporting studs 31 projecting from the face of the disk 4. The studs 31 are located in planes cutting the studs 27 and parallel with the axes of the disk and pinions 23.

Fast to each rack frame 25, at the end farthest from the point of engagement therewith of the pinion 23, is a flexible cord or strand 32 extending around the periphery of the grooved wheel 29 in the direction toward the periphery of the disk 4, thence around the grooved roller 30 to one end of a helical spring 33, which, in turn, may engage for a distance in the groove in the wheel 28 and has its corresponding end fast to a flexible cord or strand 34 laid in the groove of the wheel 28 to be ultimately passed through a perforation therein and knotted so as to be made fast thereto, as indicated at 35. The engagement of the strand 32 with the periphery of the wheel 28 is adjacent to the periphery of the disk 4, while the engagement of the spring 33 with the periphery of the wheel 28 is at that portion of the latter nearest to the axis of the disk 4.

Now, let it be assumed that the shaft 2 is standing still and power is applied to the shaft 1 to rotate the same. The wheel 8 will be directly rotated by the shaft 1 and at the same speed. The rotation of the wheel 8 acts through the links 20 to slide the rack frames 11 and 12 in their bearings, toward the periphery of the disk 4. This rectilinear movement is transmitted by the pinions 23 to the rack bars 25, so that the latter are caused to travel in a direction opposite to the direction of travel of the rack frames or bars 11 and 12. The movement of the rack bars or frames 25 is transmitted to the strands 32, acting upon the rollers 29, and also upon the springs 33 tending to elongate the latter and put them under tension. Ultimately, the pull of the rack frames 25 is exerted upon the grooved wheels near the periphery of the disk. Now, it will be apparent that there will be a considerable rotative movement of the shaft 1 before the spring is under sufficient tension to overcome the dead resistance of the load. Consequently, the time element between the starting of the power shaft and the starting of the driven shaft is great and a powerful starting torque results. Should there be variations in the load, these are readily taken care of by the reaction of the springs 33.

I claim:—

1. In a mechanism of the class described, a drive shaft, a driven shaft, a disk carried by said driven shaft and rotatable therewith, a wheel carried by the driven shaft and rotatable independently thereof, said wheel being connected to the drive shaft, a rack bar mounted for rectilinear movement and connected to said wheel, another rack bar mounted for rectilinear movement, a pinion connecting the two rack bars, a pulley or grooved wheel mounted on the disk to one side of the axis thereof, another grooved wheel coincident with the first-named groove wheel but held against rotation with relation to the disk, a spring connected with the relatively fixed grooved wheel, and a flexible strand connected to the spring and second named rack bar respectively and engaging the periphery of the first-named grooved wheel at that portion thereof remote from the axis of the disk.

2. In a mechanism of the class described, a drive shaft, a driven shaft, a disk fast on the driven shaft, a pair of grooved wheels carried by the disk on each side of the axis thereof, one of the grooved wheels being fixed with relation to the disk and the other independently rotatable, two rack bars on opposite sides of the axis of the disk and mounted for rectilinear movement in opposite directions with relation to said disk, a flexible cord or strand for each rack bar and connected at one end thereto, the said cord or strand engaging that portion of the respective movable grooved wheel remote from the axis of the disk, a spring connected to the other end of the cord or strand and itself engaging that portion of the periphery of the respective fixed grooved wheel nearest the axis of the disk, two other rack bars on opposite sides of the axis of the disk, pinions connecting the last named rack bars with the first named rack bars, a wheel connected directly to the drive shaft, and link connections between the wheel and the last named rack bars.

3. In a mechanism of the class described, a drive member, a driven member, a rotatable member connected to the drive member, reciprocating members connected to the rotatable member and progressively removed from the axis of the drive and driven members, a spring member connected to the driven member and to one of the reciprocating members, and a rotatable member interposed between the spring and the reciprocating member to which it is connected and engaged by the connections between the spring and the said reciprocating member at a point more remote from the axis of the driven member than is the reciprocating member to which this spring is connected.

4. In a mechanism of the class described, a drive shaft, a driven shaft, a disk carried by said driven shaft and rotatable therewith, a rotatable member in the axis but independent of the driven shaft, and connected directly to the drive shaft, rack bars mounted for rectilinear movement upon the disk, a link connection between the rotatable member and one of the rack bars, a pinion mounted upon the disk and engaging both rack bars, one of the said rack bars being more remote from the axis of the disk than the other rack bar, a grooved wheel mounted on said disk to one side of the axis thereof, another grooved wheel mounted in the axis of the first-named groove wheel but held against rotation with relation to the disk, a spring connected with the relatively fixed groove wheel, a cord or flexible strand connected to the spring and to the second named rack bar and engaging the periphery of the first named groove wheel at that portion thereof remote from the axis of the disk, and a guide roller mounted on the disk in operative relation to the grooved wheels and over which the flexible cord or strand is passed and its direction of movement changed.

In testimony that I claim the foregoing as my own, I have hereto affixed my signature in the presence of two witnesses.

GEORGE MILNER.

Witnesses:
PHILIP M. LOVKIN,
J. T. WATERS.